Oct. 25, 1949.  A. S. VAN HALTEREN  2,485,993
BRAKE DRUM

Filed April 12, 1946    3 Sheets-Sheet 2

INVENTOR.
ANDREW S. VAN HALTEREN
BY
ATTORNEY

Oct. 25, 1949.   A. S. VAN HALTEREN   2,485,993
BRAKE DRUM
Filed April 12, 1946   3 Sheets-Sheet 3
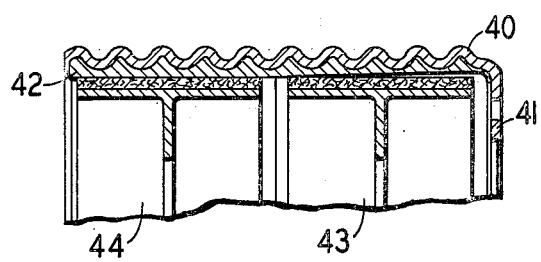
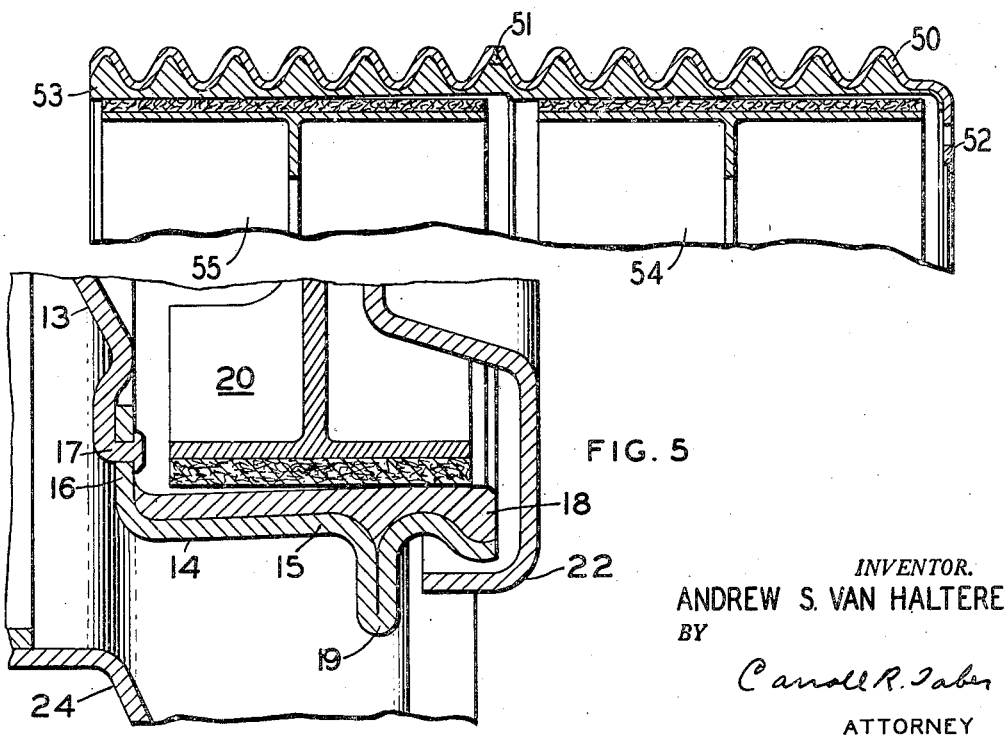
INVENTOR.
ANDREW S. VAN HALTEREN
BY
Carroll R. Faber
ATTORNEY Patented Oct. 25, 1949

2,485,993

UNITED STATES PATENT OFFICE 2,485,993

BRAKE DRUM

Andrew S. Van Halteren, Lansing, Mich., assignor to Motor Wheel Corporation, Lansing, Mich., a corporation of Michigan Application April 12, 1946, Serial No. 661,757

4 Claims. (Cl. 188—218)

This invention relates to vehicle brakes and more particularly to brake drums for use with brakes of the internal expanding type.

Brake drums for use with brake shoes of the internal expanding type are usually formed of a brake ring to which a brake back or web is rigidly connected at one edge thereof. Heretofore it has been the practice to machine the internal braking surface of the brake ring to a true cylinder after all other operations on the brake drum are performed. When such a brake drum is put into use an undesirable condition known as "bell mouthing" occurs. This condition is one in which the braking surface of the ring changes from a cylinder to a frusto-conical configuration, the larger circumference of which is at the open or free edge of the ring. This condition is particularly evident after one or more applications of the brake shoes while the brake ring is hot. It is also evident, however, after the drum has cooled. The brake ring takes a set in a frusto-conical form, the angularity of the braking surface of which continues to increase as the brakes are used more and more until a relatively stable condition is reached. This stable condition may require several hundred applications of the brake shoes. It is not meant when speaking of this stable condition that the brake ring shape does not change during an application of the brake shoes. The angularity of the braking surface does increase when the brake shoes are applied and the brake ring is heated. However, after the above mentioned stable condition has been reached the shape of the ring does not vary appreciably from cold condition to the next cold condition after the heat generated by the brake shoes has been dissipated.

The tapered or bell mouthed condition of the brake ring is very undesirable because the contact area of the brake shoes when applied to the drum is lessened, thereby reducing the effective braking effort. Also undesirable noises, such as chatter and squeal, are apparent. These noises are particularly annoying in airplane brakes because of the high brake shoe pressures required and the high brake drum temperatures reached in stopping an airplane within a relatively short distance.

The condition known as "bell mouthing" of the brake ring has a number of causes, all more or less inter-dependent. The various causes cannot be arbitrarily and sharply defined, however, in general bell-mouthing is due to unequal thermal expansion of the brake ring; unequal resistance to expansion of the ring under heat and pressure; unequal internal stresses in the ring; and unequal shrinkage of the ring.

Brake drums are anchored on the wheel or on the axle, usually the former, while permitting the brake shoes to be located in proper relation to the brake drum. Usually the anchoring means is the brake drum back or web, which is rigidly connected to the brake ring at one axial extremity of the ring. The other extremity of the ring is not supported in any way. The brake drum back carries away heat from the anchored edge of the brake ring, thereby keeping that edge cooler than the free edge. Thus, the free edge expands more when heated by friction from the brake shoes.

The brake drum back reinforces the ring in such a manner as to resist the tendency of the brake ring to expand. That resistance is, of course, more or less restricted to the anchored edge of the ring. Hence the free edge of the ring may expand more than the anchored edge under the pressure of the brake shoes and the heat generated thereby.

Also, during the process of attaching the brake drum back to the brake ring there is a tendency to expand the ring at its anchored edge, thereby relieving internal stresses at the anchored edge which have been set up by previous processes in the manufacture of the ring. Heat generated by the friction of the brake shoes tends to relieve the remaining stresses, so that the free edge expands more than the anchored edge.

When brake shoes are applied to a brake drum to stop a vehicle quickly from high speed, very high temperatures are generated by the friction between the brake shoes and brake ring. In the brakes used on wheels of heavy airplanes temperatures as high as 1500° F. often result. This rise in temperature occurs very rapidly, so much so that the internal surface of the brake ring becomes extremely hot while the outer surface remains cool. The tendency for the inner portion of the brake ring to expand under the temperature rise is resisted by the cooler outer portion so that the metal of the inner portion of the ring is upset. The resistance to expansion of the inner portion of the ring is especially great at the anchored edge because of the reinforcing effect of the brake drum back. Then when the brake ring cools it shrinks to a circumference slightly less than its previous circumference when cold. Strangely enough, the anchored edge shrinks more than the free edge. It is believed that this phenomenon occurs because of the cooling effect of the brake back on the anchored edge of the ring and the added resistance of the brake back to expansion of the anchored edge of the ring when heated, thereby causing the ring to upset more at that edge. However, the brake drum back does not seem to resist shrinkage as much as it resists expansion. Hence, the tendency for the anchored edge of the ring to shrink more than the free edge. The shrinkage occurs in small increments in repeated stops which may in time total as much as .03" in diameter for a 13"×3" drum. The difference in shrinkage between the anchored edge and the free edge of the ring often runs as much as .008" per inch of drum width.

I have discovered that this undesirable bell mouthing condition can be largely avoided by initially forming the braking surface of the brake ring with what is termed a "reverse taper," a frusto-conical shape decreasing in diameter from the anchored edge toward the free edge. Preferably the amount of reverse taper is enough so that when the brake ring finally reaches a stable condition it will still retain a small part of that taper, and in any event will not go past a substantially cylindrical shape. The amount of reverse taper will vary somewhat with the type of drum and the use to which it is put, but a reverse taper of .008" per inch of width of drum is considered to be approximately correct.

The drawings in this application illustrate various modifications of brake drums in which the brake rings have been provided with a reverse taper to compensate for the normal tendency of the brake ring to bell mouth. In the drawings:

Figure 3 is a fragmentary cross-sectional view of a still further modified form of brake ring; and Figure 4 is a fragmentary cross-sectional view of another form of brake ring embodying the invention.

Figure 5 is an enlarged detail view of a portion of the brake drum shown in Figure 1.

Figure 1:
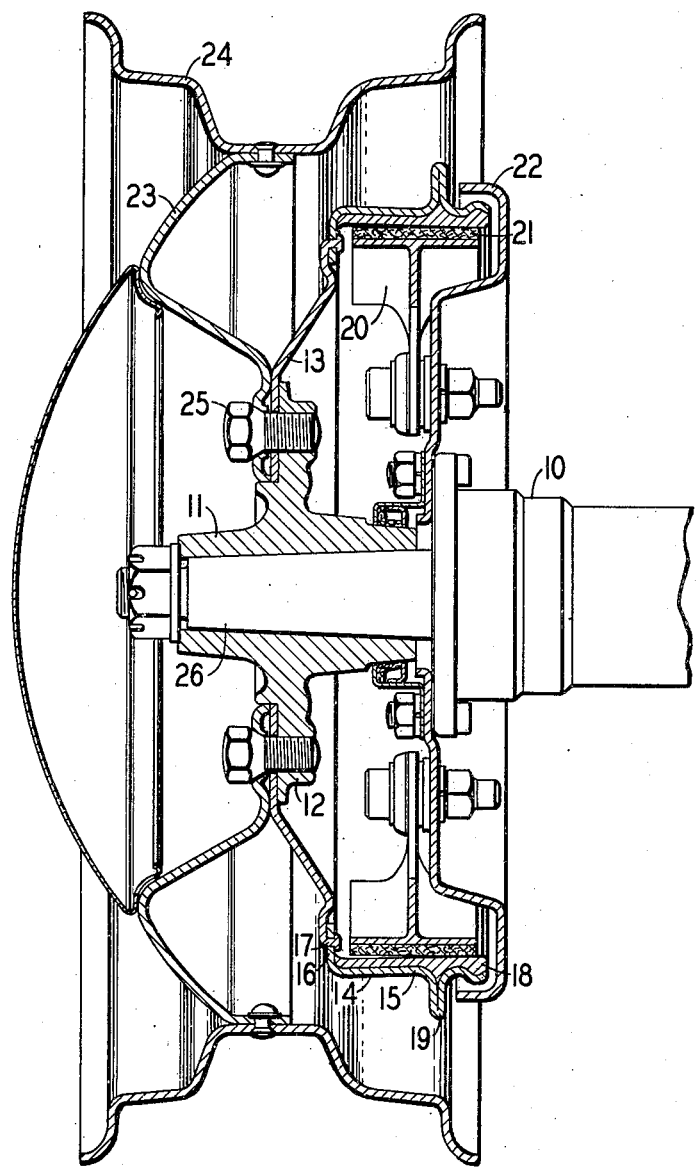
Figure 1 is a cross-sectional view of a modified form of brake drum embodying the present invention.

Figure 1 shows the important parts of a vehicle wheel and brake assembly. An axle 26 carries a hub 11 having a radial hub flange 12. Permanently secured to the hub flange 12 is a brake drum back or web 13. The back 13 forms part of the brake drum and supports the brake ring 14.

The brake ring 14 comprises a steel shell 15 having an attaching flange 16 at the anchored edge of the ring. The flange 16 is provided with apertures which receive fingers 17 integral with the rim of the back 13. The free ends of the fingers are riveted over to secure the ring to the back.

The shell is lined with cast metal 18, preferably centrifugally cast therein. A reinforcing rib 19 preferably is formed near the free edge of the brake ring 14 to stiffen the same.

Brake shoes 20 of the conventional internal expanding type, and fitted with brake shoe lining 21, are attached in the usual manner to a backing plate 22 attached to the axle housing 10.

A wheel body 23 having a rim 24 thereon is demountably secured to the hub flange 12 by cap screws 25.

It will be noted that the lining 18 in the brake ring is formed with a reverse taper. This reverse taper is much exaggerated in Figure 1, as it is in all of the other figures. Actually it is not noticeable in an actual brake ring, normally not exceeding .008" per inch of width of the brake ring.

Figure 2:
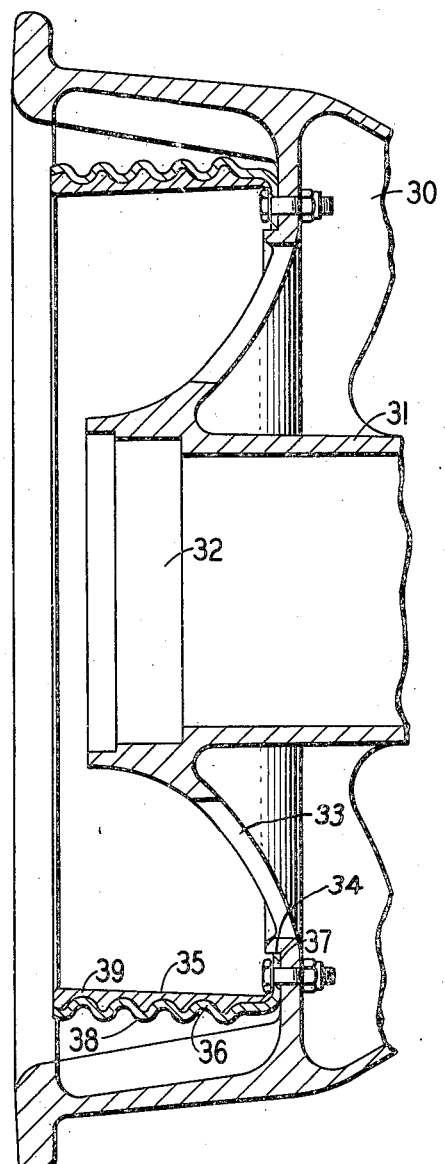
Figure 2 is a cross-sectional view of a modified form of brake drum for use on an airplane wheel.

Figure 2 discloses a modified form of brake drum associated with an airplane wheel. The wheel may be of any suitable configuration and is indicated by the numeral 30. The wheel is provided with a hub 31 having bearing seats 32 adapted to receive suitable ball or roller bearings which mount the wheel on an axle, not shown. The wheel is provided with a web 33 having an annular shoulder 34 thereon adapted to receive and locate a brake ring 35.

The brake ring 35 is composed of a steel shell 36 having an attaching flange 37 thereon. The steel shell is provided with a plurality of ribs 38 which are adapted to stiffen the brake ring and assist in dissipating heat from the ring. Preferably the internal diameters of all of the ribs are approximately equal.

The brake ring is lined with cast metal, indicated by the numeral 39. Preferably the metal is centrifugally cast by any of various well known processes. The internal surface of the cast lining 39 is machined to a frusto-conical shape with the greater diameter at the anchored edge of the ring. Thus, it will be seen that the thickness of the lining 39 is slightly greater at the free edge of the ring than at the anchored edge, while the shell is substantially cylindrical.

The brake ring is employed with suitable brake shoes of the internal expanding type, not shown, as in the previously described modification. The operation of the brake drum is the same as that of the brake previously described, and the braking surface has a tendency to become cylindrical the same as in the other form of the invention.

Figure 3 shows a brake ring for use with duplex shoes. This brake ring comprises a steel shell 40 of ribbed configuration and having an attaching flange 41 at the anchored edge of the ring. The brake ring is lined with cast iron 42. The internal braking surface of the cast iron lining is machined to a reverse tapered shape from the anchored edge of the ring to approximately the center of the ring. From the center of the free edge the lining is machined to cylindrical shape.

The ring is provided with duplex shoes 43 and 44 arranged side by side with shoe 43 acting on the tapered portion of the ring and shoe 44 acting on the cylindrical portion. Since the brake ring disclosed in Figure 3 is relatively wide in an axial direction I have discovered that the reverse taper need be employed only in the half of the ring adjacent the attaching flange. Then when shrinkage on the ring occurs during use the entire brake ring tends to become cylindrical.

Figure 4 illustrates a still further modified form of brake ring of relatively great axial extent. This ring is made up of a steel shell 50 formed in two parts welded together at 51. The shell is ribbed and is provided with an attaching flange 52. A centrifugally cast lining 53 is molded into the shell. The internal surface of the lining is machined to a reverse taper from the attaching flange to the center of the brake ring. Another reverse taper is machined in the lining beginning at the center of the ring and extending to the free edge of the ring. Brake shoes 54 and 55 of the duplex type are employed with this ring.

From the foregoing it will be seen that the present invention overcomes the difficulties inherent in previous types of brake rings. By forming a reverse taper in the brake ring the brake shoes are first applied to a smaller edge of the ring and the pressure at that point is greatest when the brakes are first put into use. Eventually as the brake ring becomes set in its cylindrical condition the pressure will be substantially equalized throughout the brake ring. The reverse taper appears to have little or no effect upon the amount of wear either on the brake ring or on the brake shoes.

The scope of the invention is indicated in the appended claims.

I claim:

1. A brake drum for use with brake shoes of the internal expanding type having partial cylindrical outer braking surfaces comprising a braking ring having an anchored edge and a free edge and provided with an internal braking surface between said edges which is adapted to be frictionally engaged by the cylindrical braking surfaces of said shoes, and a supporting web fixedly connected to said anchored edge, the internal braking surface of said ring being of such smaller internal diameter at said free edge than at the anchored edge that the brake drum tends to assume a cylindrical shape after repeated heating and cooling due to braking use with said shoes.

2. A brake drum for use with brake shoes of the internal expanding type having partial cylindrical outer braking surfaces comprising a braking ring having an anchored edge and a free edge, said braking ring consisting of an outer shell of pressed sheet metal and a lining of cast metal fused therein to form an internal braking surface between the free edge and the anchored edge of said braking ring, and a supporting web fixedly connected to said anchored edge, the internal braking surface of said ring being of such smaller internal diameter adjacent said free edge than at the anchored edge that the brake drum tends to assume a cylindrical shape after repeated heating and cooling due to braking use with said shoes.

3. A brake drum for use with brake shoes of the internal expanding type having partial cylindrical outer braking surfaces comprising a braking ring having an anchored edge and a free edge and provided with an internal braking surface between said edges which is adapted to be frictionally engaged by the cylindrical braking surfaces of said shoes, and a supporting web rigidly connected to the anchored edge of the ring thereby making that edge less subject to expansion and more subject to shrinkage under heat and pressure than the free edge, the internal braking surface of the ring being of smaller internal circumference at said free edge than at the anchored edge thereof by an amount such that the internal circumference of braking surface of said ring at the free edge of the ring will not become greater than the internal circumference of said braking surface at the anchored edge of the ring after repeated use and when said ring is relatively cool.

4. A brake drum for use with brake shoes of the internal expanding type having partial cylindrical outer braking surfaces comprising a braking ring having an anchored edge and a free edge and provided with an internal braking surface between said edges which is adapted to be frictionally engaged by the cylindrical braking surfaces of said shoes, and a supporting web rigidly connected to the anchored edge of the ring thereby making that edge less subject to expansion and more subject to shrinkage under heat and pressure than the free edge, the internal braking surface of said ring decreasing in diameter before use from the anchored edge to the free edge of said ring by an amount not exceeding .008 inch per inch of width whereby said braking surface tends to assume a cylindrical shape after repeated use with said shoes.

ANDREW S. VAN HALTEREN.

REFERENCES CITED

The following references are of record in the file of this patent:

UNITED STATES PATENTS

| Number | Name | Date |
|---|---|---|
| 1,184,545 | Langley | May 23, 1916 |
| 1,800,900 | Norton | Apr. 14, 1931 |
| 2,126,945 | Bragg | Aug. 16, 1938 |